United States Patent [19]

Ueruenduel et al.

[11] Patent Number: 4,921,040
[45] Date of Patent: May 1, 1990

[54] POWER THERMO-COUPLING UNIT

[75] Inventors: Celal Ueruenduel; Friedemann Zacharias, both of Mannheim, Fed. Rep. of Germany

[73] Assignee: Motoren-Werke Mannheim AG, Fed. Rep. of Germany

[21] Appl. No.: 166,924

[22] Filed: Mar. 11, 1988

[30] Foreign Application Priority Data

Mar. 16, 1987 [DE] Fed. Rep. of Germany ....... 3708238

[51] Int. Cl.⁵ ............................ F01N 7/02; F01N 3/02
[52] U.S. Cl. ........................................ 165/51; 165/76; 165/78; 60/320; 181/211; 181/232; 181/243; 181/204
[58] Field of Search ............... 165/51, 76, 78; 60/295, 60/320; 181/204, 211, 212, 283, 232, 243

[56] References Cited

U.S. PATENT DOCUMENTS

| 115,870 | 6/1871 | LaGorce | 165/78 |
| 2,673,446 | 3/1954 | De Salardi | 60/295 |
| 2,801,828 | 8/1957 | Wilson | 165/51 |
| 3,317,001 | 5/1967 | Powers et al. | 181/232 |
| 3,500,954 | 3/1970 | Willette | 181/232 |
| 4,645,031 | 2/1987 | Omura et al. | 181/232 |

FOREIGN PATENT DOCUMENTS

| 0914203 | 10/1946 | France | 181/204 |
| 2550820 | 2/1985 | France | 60/295 |
| 0017416 | 2/1979 | Japan | 60/320 |

Primary Examiner—Albert W. Davis, Jr.
Assistant Examiner—John K. Ford
Attorney, Agent, or Firm—Charles L. Schwab

[57] ABSTRACT

A power thermo-coupling unit with muffler (4, 5) and exhaust gas heat exchanger (6, 7) avoids the requirement of a disproportionately large space for component removal at the front end of the power thermo-coupling unit. The muffler (4, 5) and the exhaust gas heat exchanger (6, 7) each have two separate components, the lengths of which are shorter than the distances between the center column (8) and the end walls of the unit support (1).

11 Claims, 2 Drawing Sheets

POWER THERMO-COUPLING UNIT

TECHNICAL FIELD

This invention relates to a power thermo-coupling unit and particularly to a support for mounting such a unit.

PRIOR ART STATEMENT

It is a common practice to elastically support a power thermo-coupling unit such as an internal combustion engine generator set or other engine driven machine on a frame or unit support. The unit support is secured to a floor of the building and contains all of the exhaust gas heat exchangers or radiators necessary for a power thermo-coupling unit, as well as mufflers, for the engine exhaust. The unit support includes a rectangular-shaped frame which has openings in all its vertical sides. In order to increase overall stability, the unit support has a central column which divides the unit support into two parts. Two longitudinal holes are arranged in the central column through which components of mufflers and heat exchangers are guided and installed in the unit support. For the purpose of maintaining, cleaning and replacing these components, they are removed by pulling them in a longitudinal direction through openings in the front wall of the unit support.

A disadvantage of this arrangement lies in the fact that, in order to remove the mufflers and the exhaust gas heat exchangers longitudinally through the openings in the front wall, floor space must be made available to accommodate the length of the muffler and/or the exhaust gas heat exchanger and the muffler and/or exhaust gas heat exchanger must have a high level of rigidity because of the length thereof.

OBJECTS AND BRIEF DESCRIPTION OF THE INVENTION

It is a main object of this invention to provide a power thermo-coupling unit which is cost efficient and in which the muffler and exhaust gas heat exchanger components can be easily removed for cleaning or replacement.

This invention meets the foregoing object by providing a muffler and an exhaust gas heat exchanger, each designed to have at least two separate components with the length of each component being less than the distance between the central column and the front or rear side. This permits the components to be disconnected and shifted laterally through side openings. Thus, the muffler and the exhaust gas heat exchanger are readily accessible for maintenance and replacement. Because of their limited length, the components are sufficiently light in weight to permit a serviceman to pull them laterally from the unit support. It is not necessary to have maneuvering space available at the front end of the unit support, and only a small amount of space is required at the longitudinal side of the unit support to permit removal of the muffler and heat exchanger components. In addition, a division of the muffler and heat exchanger into separate components permits removal of only that component which needs to be removed for maintenance or repair. The individual components can also be manufactured from various materials chosen to meet the operational requirements of the components.

The height of the components is less than the vertical dimension of the side openings of the unit support to permit the components to be removed through such side openings.

In the preferred embodiment of the invention the muffler includes two components, one of which forms a reflection chamber and the other of which forms an absorption chamber. In a similar manner, the exhaust gas heat exchanger includes two components, one of which is designed as a high-temperature component and the other of which is designed as a low-temperature component.

In the case of the exhaust gas heat exchanger, the division into two components permits inexpensive steel to be used for the high-temperature component and more expensive alloy steel to be used in the low-temperature component where condensate occurs. This results in a significant savings. The separate replaceability of the components is a particular advantage because the service life of the components will be different.

It is desirable to connect the reflection chamber component with the absorption chamber component and the low-temperature component with the high-temperature component by means of connecting pieces which extend through longitudinal openings in the central column. The connecting pieces are preferably designed for flanged connection to the components.

In the preferred embodiment of the invention, the components are provided with support brackets which are guided in tracks on the unit support to facilitate lateral sliding removal of the components.

BRIEF DESCRIPTION OF THE DRAWINGS

Additional features of the invention can be found in the following description of the drawings illustrating one embodiment of the invention, in which.

DETAILED DESCRIPTION OF THE INVENTION

Figure 1:
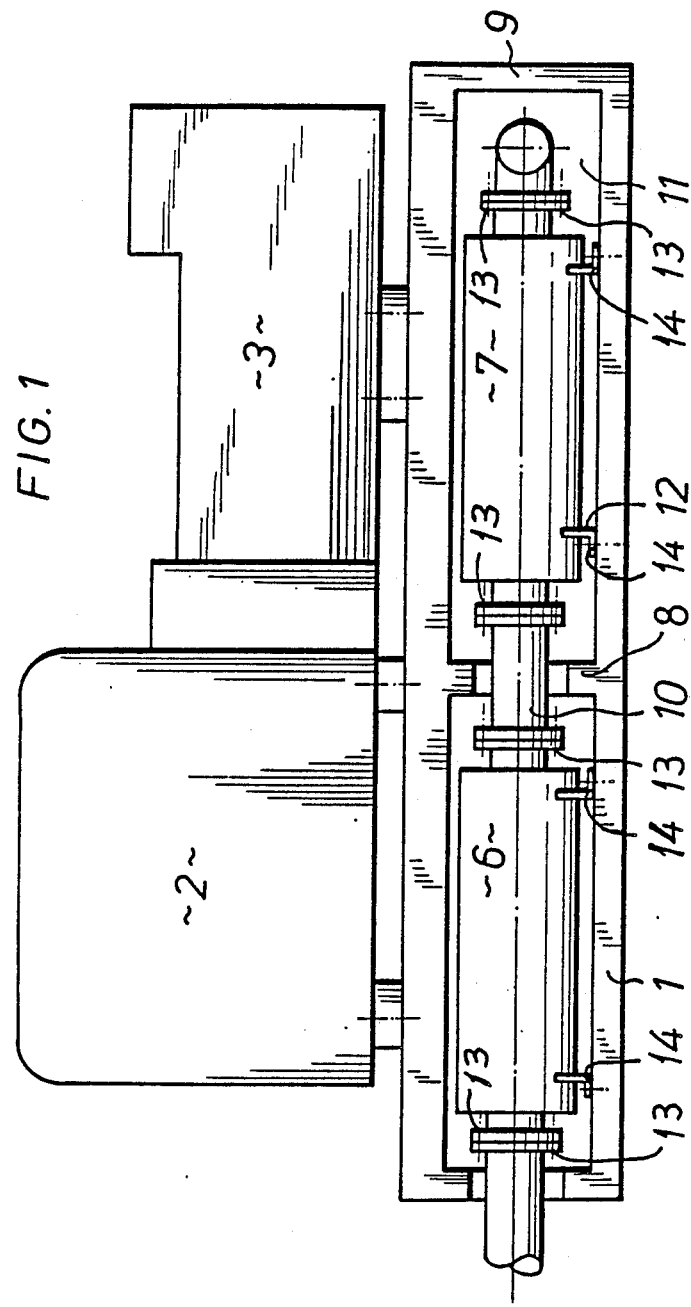
FIG. 1 is a side view of a power thermo-coupling unit.

FIG. 1 is a side view of a power thermo-coupling unit incorporating the present invention. An engine and generator set, consisting of an engine 2 drivingly connected to a generator 3, is elastically supported on a unit pad or support 1. Working machines other than an engine and generator unit may also be thus supported. The unit support 1 consists of a rectangular frame having top, bottom and end walls defining openings 11 on both its lateral sides. In order to increase stability of the unit support 1, a central column 8 extends laterally and vertically between the top and bottom walls and divides the interior of the unit support into two adjacent compartments. In these compartments of the unit support 1, a muffler 4, 5 and an exhaust gas heat exchanger 6, 7 (see FIG. 2) are supported and positioned parallel to the longitudinal vertical plane of the generator set and to the longitudinal sides of the support unit 1.

Figure 2:
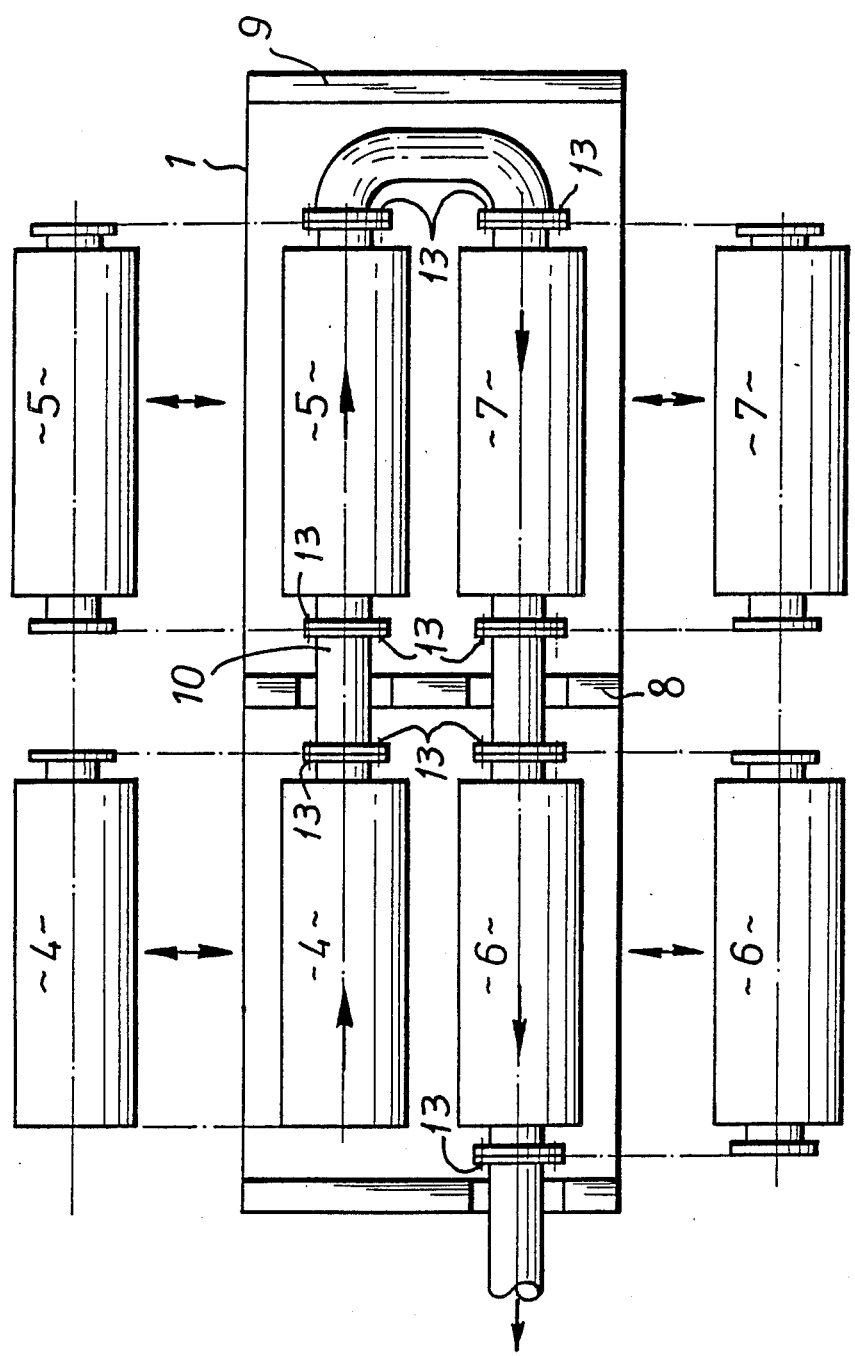
FIG. 2 is a section view on a horizontal plane in which the muffler and heat exchanger components lie.

The muffler 4, 5 and.. the exhaust gas heat exchanger 6, 7 each consist of two separable components connected to each other by connecting pieces 10 having flanged connections with the related components. The connecting pieces 10 extend through longitudinal openings in the central column 8 and consist of a pipe with radially outwardly extending flanges at each end which are secured to flanges on the separable components by suitable releasable fastening means shown at 13:

FIG. 2 illustrates removability of the components, which is an important feature of the invention. The two components of the muffler 4, 5 consist of a reflection chamber 4 and an absorption chamber 5, with the absorption chamber 5 series connected in downstream relation to the reflection chamber 4. The direction of flow is indicated by arrows in FIG. 2. The exhaust gas heat exchanger components 6, 7 are series connected downstream of the muffler 4, 5 and are disposed parallel to the muffler 4, 5. A U-shaped connector changes the direction of the flow from the muffler 4, 5 one hundred and eighty degrees so that the exhaust gases flow through the heat exchanger 6, 7 in an opposite parallel direction to its flow through the muffler 4, 5. In the exhaust gas heat exchanger 6, 7, the low-temperature component 6 is arranged downstream in the direction of flow from the high-temperature component 7.

Support brackets 12 are provided on the components by which the components are secured to the unit support by releasable fasteners, not shown. In order to facilitate easy sliding removal of the components from the unit support 1, the brackets 12 are guided by tracks shown at 14. Thus the components with their brackets 12 may be slid like a shelf or drawer from the unit support 1.

This invention provides a power thermo-coupling unit which is compact, easy to maintain and cost effective.

The embodiments of the invention in which an exclusive property or privilege is claimed are defined as follows:

1. A power thermo-coupling unit having a unit support (1), upon which working machines (2, 3) are supported, with a muffler (4, 5) and a connected exhaust gas heat exchanger (6, 7) arranged within the unit support (1), wherein the unit support (1) has a rectangular-shaped frame having longitudinally opposite end walls, lateral openings (11) on opposite lateral sides and a central column (8) with longitudinal openings through which the muffler (4, 5) and the exhaust gas heat exchanger (6, 7) pass the muffler and heat exchanger being generally parallel to the lateral sides of the unit support (1), characterized by said muffler (4, 5) and exhaust gas heat exchanger (6, 7) each being formed by two separate components disposed on opposite sides of said column (8) and shorter in length than the distances between said central column (8) and said end walls, respectively whereby the components can be disconnected and shifted laterally through the lateral openings.

2. The power thermo-coupling unit of claim 1, wherein the height of said components is less than the height of said lateral openings (11) of said unit support (1).

3. The power thermo-coupling unit of claim 2, wherein said muffler (4, 5) includes two components, one of which forms a reflection chamber (4) and the other of which forms an absorption chamber (5).

4. The power thermo-coupling unit of claim 3 wherein said exhaust gas heat exchanger (6, 7) includes two components, one of which is a high-temperature component (7) and the other of which is a low-temperature component (6).

5. The power thermo-coupling unit of claim 4 wherein said central column has laterally longitudinal openings and wherein said components of said muffler are interconnected by a connecting piece (10) extending through one of said longitudinal openings in said central column (8) and wherein said components of said heat exchanger are interconnected by a connecting piece (10) extending through the other of said longitudinal openings in said central column (8).

6. The power thermo-coupling unit of claim 5 wherein said connecting pieces (10) and components have end flanges connected by releasable fastening means.

7. The power thermo-coupling unit of claim 6 and further comprising support brackets (12) on said components adapted for releasable connection to said unit support and facilitating lateral sliding thereof when disconnected from said unit support.

8. The power thermo-coupling unit of claim 7 wherein said support brackets are guided in tracks.

9. The power thermo-coupling unit of claim 1 wherein said central column extends laterally and said longitudinal openings are laterally spaced from one another.

10. The power thermo-coupling unit of claim 9 wherein said components of said muffler are connected by a tubular connecting piece extending through one of said longitudinal openings and said components of said heat exchanger are interconnected by a tubular connecting piece extending through the other of said longitudinal openings.

11. The power thermo-coupling unit of claim 10 wherein said components and connecting pieces have end flanges rigidly connected to one another by releasable fastening means and wherein said components are laterally removable through said lateral openings upon said fastening means being released.

* * * * *

UNITED STATES PATENT AND TRADEMARK OFFICE
CERTIFICATE OF CORRECTION

PATENT NO. : 4,921,040
DATED : May 1, 1990
INVENTOR(S) : Celal Ueruenduel and Friedemann Zacharias It is certified that error appears in the above-identified patent and that said Letters Patent is hereby corrected as shown below:

Column 3, line 41, after "pass" insert a comma (,);

line 45, cancel "rate" and substitute --- rable ---;

Column 4, line 15, after "has" insert --- two ---;

line 15, after "laterally" insert --- spaced ---.

Signed and Sealed this

Twentieth Day of July, 1993

Attest:

MICHAEL K. KIRK

Attesting Officer      Acting Commissioner of Patents and Trademarks